(12) United States Patent  
Huang

(10) Patent No.: US 11,799,998 B2  
(45) Date of Patent: Oct. 24, 2023

(54) TERMINAL DEVICE

(71) Applicant: VIVO MOBILE COMMUNICATION CO., LTD., Guangdong (CN)

(72) Inventor: Pan Huang, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 311 days.

(21) Appl. No.: 17/460,416

(22) Filed: Aug. 30, 2021

(65) Prior Publication Data

US 2021/0392216 A1    Dec. 16, 2021

Related U.S. Application Data

(63) Continuation of application No. PCT/CN2020/074978, filed on Feb. 13, 2020.

(30) Foreign Application Priority Data

Mar. 1, 2019   (CN) .......................... 201910155862.4

(51) Int. Cl.
| | |
|---|---|
| *G06F 1/16* | (2006.01) |
| *G09F 9/33* | (2006.01) |
| *G02F 1/13357* | (2006.01) |
| *H04M 1/02* | (2006.01) |
| *F21V 8/00* | (2006.01) |

(52) U.S. Cl.
CPC ........ *H04M 1/0266* (2013.01); *G02B 6/0081* (2013.01)

(58) Field of Classification Search
None
See application file for complete search history.

(56) References Cited

U.S. PATENT DOCUMENTS

| | | | | |
|---|---|---|---|---|
| 7,116,059 B2 * | 10/2006 | Hori | ................... | H05K 7/20972 |
| | | | | 315/169.3 |
| 7,561,152 B2 * | 7/2009 | Hori | ..................... | G09G 3/2944 |
| | | | | 313/582 |
| 7,755,287 B2 * | 7/2010 | Hori | ......................... | H01J 11/34 |
| | | | | 313/313 |
| 7,898,510 B2 * | 3/2011 | Hori | ................... | H05K 7/20972 |
| | | | | 315/169.3 |
| 8,587,883 B2 * | 11/2013 | Matsuoka | .............. | G02B 7/021 |
| | | | | 359/819 |
| 9,837,852 B1 * | 12/2017 | Barnes | ...................... | F21V 7/22 |
| 9,977,514 B1 * | 5/2018 | Greene | .............. | G06F 3/04186 |
| 10,101,841 B2 * | 10/2018 | Li | ............................ | G01L 25/00 |
| 10,657,352 B2 * | 5/2020 | Lee | ...................... | G02B 6/0016 |

(Continued)

FOREIGN PATENT DOCUMENTS

| | | | | |
|---|---|---|---|---|
| CN | 107682598 A | | 2/2018 | |
| CN | 108469704 | * | 8/2018 | ......... G02F 1/13357 |

(Continued)

*Primary Examiner* — Tuan A Tran  
(74) *Attorney, Agent, or Firm* — Price Heneveld LLP

(57) ABSTRACT

A terminal device is provided and includes: a display screen; a glass cover plate disposed above the display screen; a housing with an accommodating gap, where the accommodating gap is below the glass cover plate; a light guide column disposed in the accommodating gap; and an infrared fill-in light is disposed below the light guide column, where a light-shielding body is disposed between the light guide column and the display screen.

10 Claims, 5 Drawing Sheets

(56) References Cited

U.S. PATENT DOCUMENTS

| | | | | |
|---|---|---|---|---|
| 10,859,866 B2* | 12/2020 | Fujii | ................. | G02F 1/133308 |
| 10,929,637 B2* | 2/2021 | Kim | ................... | G06V 40/1329 |
| 10,942,995 B2* | 3/2021 | Won | ..................... | G06F 3/0412 |
| 11,194,986 B2* | 12/2021 | Li | ......................... | G06V 10/141 |
| 11,233,422 B2* | 1/2022 | Ha | ......................... | H02J 50/005 |
| 11,378,253 B2* | 7/2022 | Park | ..................... | G02B 3/0006 |
| 11,393,244 B2* | 7/2022 | Lee | ......................... | H10K 59/40 |
| 2017/0124376 A1* | 5/2017 | Wyrwas | ............... | G06V 10/143 |

FOREIGN PATENT DOCUMENTS

| | | | | |
|---|---|---|---|---|
| CN | 108600459 A | | 9/2018 | |
| CN | 108848217 A | | 11/2018 | |
| CN | 108881543 A | | 11/2018 | |
| CN | 108932024 | * | 12/2018 | ............... G06F 1/16 |
| CN | 109003570 A | | 12/2018 | |
| CN | 109348007 A | | 2/2019 | |
| CN | 109788096 A | | 5/2019 | |
| EP | 3136695 A1 | | 8/2016 | |

\* cited by examiner

TERMINAL DEVICE

CROSS-REFERENCE OF RELATED APPLICATION

This application is continuation application of PCT International Application No. PCT/CN2020/074978 filed on Feb. 13, 2020, which claims priority to Chinese Patent Application No. 201910155862.4, filed on Mar. 1, 2019 in China, the disclosures of which are incorporated herein by reference in their entireties.

TECHNICAL FIELD

Embodiments of the present disclosure relate to the field of communications technologies, and in particular, to a terminal device.

BACKGROUND

With the development and popularization of intelligent terminals (such as mobile phones), functions of intelligent terminals are becoming increasingly powerful. In addition to commonly used photographing, facial recognition also becomes more and more popular, and especially an unlocking technology based on facial recognition has been used more and more widely. In conditions with poor lighting, a technology assisting facial recognition and unlocking is generally screen light filling-in or infrared light filling-in. Because screen light filling-in is accompanied by high screen brightness and causes glare and poor user experience, infrared fill-in light is more favored by users. However, a light guide in an infrared light filling-in structure is close to a display screen, and light rays from an infrared fill-in light to the light guide column is likely to pass through the light guide and strikes the display screen, which causes color changes and light leakage of the display screen, and affects the use of an intelligent terminal by users.

SUMMARY

Embodiments of the present disclosure provide a terminal device.

To solve the foregoing problem, the following solutions are used in the present disclosure.

Some embodiments of the present disclosure provide a terminal device, including:

a display screen;

a glass cover plate disposed above the display screen;

a housing with an accommodating gap, where the accommodating gap is below the glass cover plate;

a light guide column disposed in the accommodating gap; and an infrared fill-in light is disposed below the light guide column, where a light-shielding body is disposed between the light guide column and the display screen.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to enable a more thorough understanding of the present disclosure and to fully convey the scope of the present disclosure to those skilled in the art.

According to a first aspect of the embodiments of the present disclosure, a terminal device is provided. The terminal device may be a mobile terminal (for example, a mobile phone, a tablet computer, a notebook computer, a palmtop computer, a vehicle-mounted terminal, or a wearable device), a desktop computer, a smart television, or the like.

Figure 1:
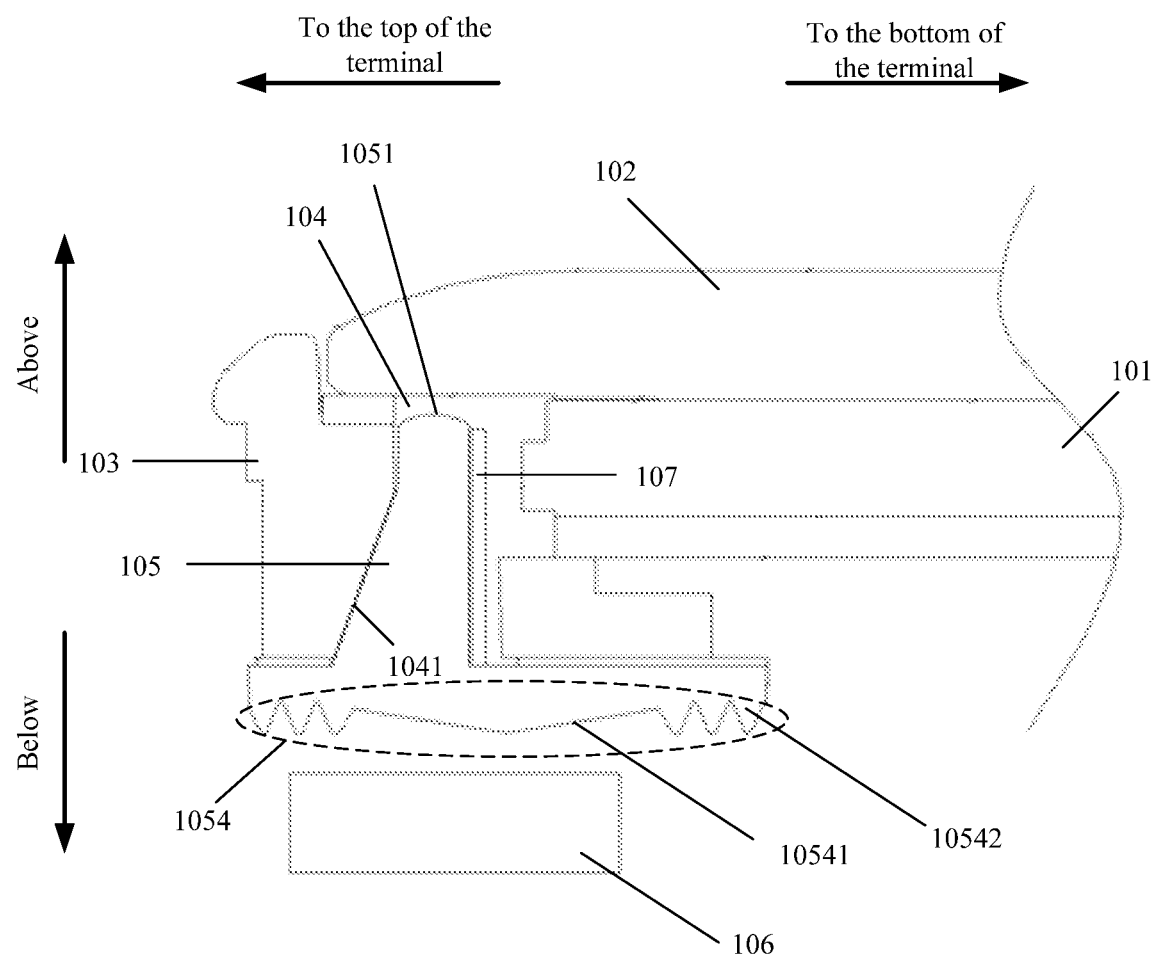
FIG. 1 is a first sectional view of a terminal device according to some embodiments of the present disclosure.
Figure 2:
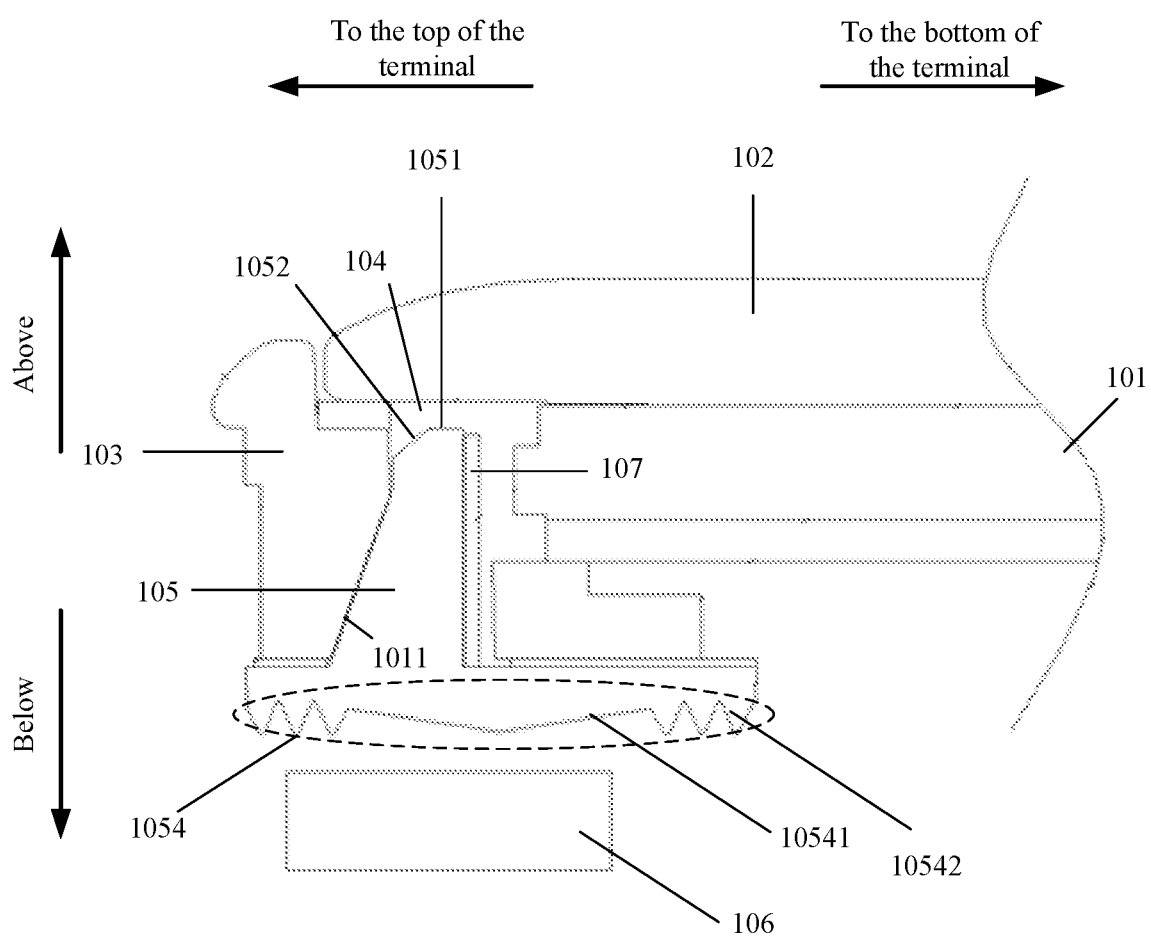
FIG. 2 is a second sectional view of a terminal device according to some embodiments of the present disclosure.
Figure 3:
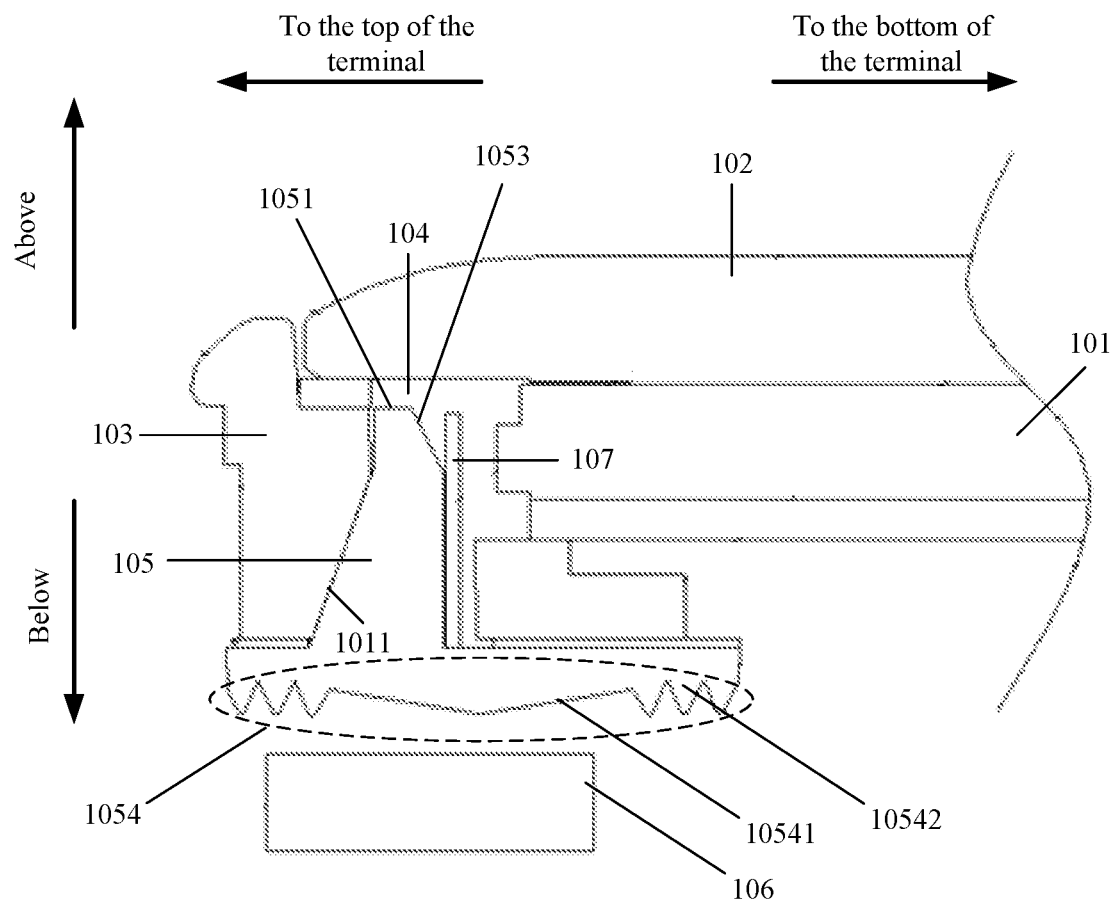
FIG. 3 is a third sectional view of a terminal device according to some embodiments of the present disclosure.

As shown in FIG. 1 to FIG. 3, the terminal device includes: a display screen 101; a glass cover plate 102 disposed above the display screen 101; a housing 103, where the housing 103 has an accommodating gap 104, and the accommodating gap 104 is below the glass cover plate 102; a light guide column 105 disposed in the accommodating gap 104; and an infrared fill-in light 106 disposed below the light guide column 105.

A light-shielding body 107 is disposed between the light guide column 105 and the display screen 101 to prevent light rays emitted by the infrared fill-in light 106 from striking the display screen 101, and thereby avoid color changes and light leakage of the display screen 101.

Optionally, the light-shielding body 107 is spaced from the light guide column 105, and is specifically disposed on a side wall of the accommodating gap 104 that is close to a side of the display screen 101. In this way, there is a specific space (greater than 0) between the light-shielding body 107 and the light guide column 105, which can reduce absorption, by the light-shielding body 107, of the light rays emitted by the infrared fill-in light 106.

Optionally, the light-shielding body 107 is copper foil, and a relatively hard texture of the copper foil makes easy mounting. The copper foil may be bonded by means of an adhesive to the side wall of the accommodating gap 104 that is close to the side of the display screen 101.

Further, in some embodiments of the present disclosure, the light guide column 105 includes: an out-light surface for enhancing energy of a central area of a light beam or energy of a surrounding area outside the central area of the light beam. The light beam mentioned herein is a light beam formed by light rays from the infrared fill-in light passing through the light guide column 105 to the outside of the terminal device.

The out-light surface of the light guide column 105 provided in some embodiments of the present disclosure is described in detail as follows:

(1) The out-light surface of the light guide column 105 that faces the glass cover plate 102 includes: a first out-light surface 1051 that faces the glass cover plate 102 and is arc-shaped, as shown in FIG. 1.

The arc-shaped surface described herein is an arc-shaped surface protruding in a direction of the glass cover plate 102. The arc-shaped first out-light surface 1051 can increase the energy of the central area of the light beam to the outside of the terminal device.

In facial recognition, generally, the central area of the light beam is used to illuminate a central area of a human face as much as possible, and the surrounding area of the light beam (namely, an area outside the central area) is used to illuminate a surrounding area of the human face (namely, an area outside the central area of the human face). Therefore, a light guide effect of the arc-shaped first out-light surface 1051 is that illuminance of the central area of the human face in facial recognition can be increased.

(2) The out-light surface of the light guide column 105 that faces the glass cover plate 102 includes: the first out-light surface 1051 that faces the glass cover plate 102 and is flat or arc-shaped, and a second out-light surface 1052 that faces a top direction of the terminal device and is inclined, as shown in FIG. 2.

The arc-shaped surface described herein is an arc-shaped surface protruding in a direction of the glass cover plate 102. When the first out-light surface 1051 is arc-shaped, the energy of the central area of the light beam to the outside of the terminal device can be increased. During facial recognition, it may be specifically embodied as increasing illuminance of the central area of the human face.

A function of the second out-light surface 1052 is mainly to guide the light rays toward the top direction of the terminal device, and to increase the energy of the light beam toward the top of the terminal device. During facial recognition, it may be specifically embodied as increasing illuminance of a forehead area of the human face.

When it is not necessary to increase the energy of the central area of the light beam, the first out-light surface may be designed to be a flat surface.

(3) The out-light surface of the light guide column 105 that faces the glass cover plate 102 includes: the first out-light surface 1051 that faces the glass cover plate 102 and is flat or arc-shaped, and a third out-light surface 1053 that is away from the top direction of the terminal device and is inclined, as shown in FIG. 3.

The arc-shaped surface described herein is an arc-shaped surface protruding in a direction of the glass cover plate 102. When the first out-light surface 1051 is arc-shaped, the energy of the central area of the light beam to the outside of the terminal device can be increased. During facial recognition, it may be specifically embodied as increasing illuminance of the central area of the human face.

A function of the third out-light surface 1053 is mainly to direct the light rays away from the top direction of the terminal device (that is, toward a bottom direction of the terminal device), and to increase energy of the light beam toward the bottom direction of the terminal device. During facial recognition, it may be specifically embodied as increasing illuminance of a chin area of the human face.

When it is not necessary to increase the energy of the central area of the light beam, the first out-light surface may be designed to be a flat surface.

(4) The out-light surface of the light guide column 105 that faces the glass cover plate 102 includes: the first out-light surface 1051 that faces the glass cover plate 102 and is flat or arc-shaped, the second out-light surface 1052 that faces the top direction of the terminal device and is inclined, and the third out-light surface 1053 that is away from the top direction of the terminal device and is inclined.

The arc-shaped surface described herein is an arc-shaped surface protruding in a direction of the glass cover plate 102. When the first out-light surface 1051 is arc-shaped, the energy of the central area of the light beam to the outside of the terminal device can be increased. During facial recognition, it may be specifically embodied as increasing illuminance of the central area of the human face.

A function of the second out-light surface 1052 is mainly to guide the light rays toward the top direction of the terminal device, and to increase the energy of the light beam toward the top of the terminal device. During facial recognition, it may be specifically embodied as increasing illuminance of a forehead area of the human face.

A function of the third out-light surface 1053 is mainly to direct the light rays away from the top direction of the terminal device (that is, toward a bottom direction of the terminal device), and to increase energy of the light beam toward the bottom direction of the terminal device. During facial recognition, it may be specifically embodied as increasing illuminance of a chin area of the human face.

It should be noted that, when it is not necessary to increase the energy of the central area of the light beam, the first out-light surface may be designed to be a flat surface. In addition, the embodiments described in (1) to (4) above may be selected according to actual needs.

Further, in some embodiments of the present disclosure, in order to make the light rays emitted by the infrared fill-in light 106 reach the outside of the terminal as much as possible, a light-emitting surface of the infrared fill-in light 106 is aligned with the out-light surface of the light guide column 105, that is, projection of the light-emitting surface of the infrared fill-in light 106 on the glass cover plate 102 coincides with projection of the first out-light surface 1051 of the light guide column 105 on the glass cover plate 102.

Optionally, an eccentricity of the light-emitting center of the infrared fill-in light 106 to the center of the first out-light surface 1051 of the light guide column 105 is less than a preset value. The preset value is a relatively small value, such as 0.80 mm. A smaller eccentricity indicates a larger total number of light beams to the outside of the terminal device. Therefore, during design, the light-emitting center of the infrared fill-in light 106 and the center of the first out-light surface 1051 of the light guide column 105 may be made to be concentric as much as possible, that is, a value of the eccentricity is 0.

Further, in some embodiments of the present disclosure, one end of the light guide column 105 toward the infrared fill-in light 106 extends to the outside of the accommodating gap 104, and extends around the horizontal direction to be bonded to the housing 103. The in-light surface of the light guide column forms a side of the extension portion of the light guide column that faces the infrared fill-in light 106.

In some embodiments of the present disclosure, in addition to improvement to the out-light surface of the light guide column 105, improvements may also be made to the in-light surface of the light guide column 105, so as to improve the light guide effect. For example, a light guide patterned path is formed on the in-light surface of the light guide column 105 facing the infrared fill-in light 106. The light guide patterned path can adjust a propagation direction of light rays, has a shaping and optimizing effect on the light rays irradiated on it, and adjusts energy distribution between the central area and the surrounding area of the light beam.

Specifically, the light guide patterned path includes: a circular central circle 10541 and a plurality of tooth-shaped structures 10542 arranged around the central circle 10541. A surface of the central circle 10541 is an arc-shaped surface, and teeth in the tooth-shaped structures 10542 point to a direction of the infrared fill-in light 106.

The infrared fill-in light 106 is disposed opposite the central circle 10541. A size of the central circle 10541 affects central energy of the light beam passing through the out-light surface of the light guide column 105. Generally, the larger the central circle 10541, the higher the energy in the central area of the beam, and the lower the energy in the surrounding area; conversely, the smaller the central circle 10541, the lower the energy in the central area of the beam, and the higher the energy in the surrounding area. A depth, an angle, and a distance between these tooth-shaped structures 10542 also affect the distribution of the light rays of the light beam, and mainly affect the energy in the surrounding area of the light beam.

Optionally, in some embodiments of the present disclosure, an inclined surface is formed on part of a side wall (hereinafter referred to as a first side wall) 1031 of the accommodating gap 104 away from the display screen. The inclined surface makes a width of the accommodating gap 104 at the end close to the glass cover plate 102 less than a width at the end away from the glass cover plate 102, so as to increase the space of the accommodating gap 104. A shape of the light guide column 105 adapts to a shape of the accommodating gap 104, that is, a width of the light guide column 105 corresponding to the inclined surface gradually increases toward the direction of the infrared fill-in light 106. This can ensure the size of the light guide column 105 to the greatest extent and increase an out-light rate of the light guide column, improving the light guide effect.

Further, in some embodiments of the present disclosure, a bottom surface of the glass cover plate is provided with an ink layer at a position corresponding to the accommodating gap. An infrared light transmittance of the ink layer is greater than a first preset value, a visible light transmittance is less than a second preset value, and the first preset value is greater than the second preset value.

The first preset value is a larger value, generally greater than or equal to 85%. The second preset value is a smaller value, generally less than or equal to 5%. It can be learned from above that, in some embodiments of the present disclosure, the infrared light transmittance of the ink layer is very high, and the visible light transmittance is very low, which can reduce impact on the energy of the infrared light passing through the ink layer. In addition, because infrared light is invisible to human eyes, a user can hardly see an infrared fill-in light structure below the ink layer through the ink layer, which can better ensure the appearance of the terminal device.

Figure 4:
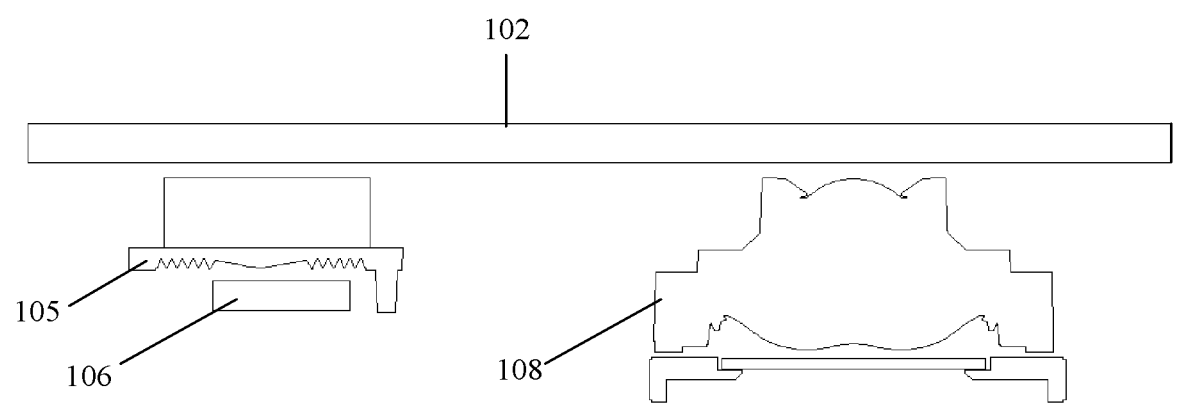
FIG. 4 is a fourth sectional view of a terminal device according to some embodiments of the present disclosure.

Further, for the terminal device in the related art, when the terminal device has a front camera photographing function and an infrared light filling-in function, it is generally necessary to provide a camera module corresponding to the front camera photographing function, and the camera module can only transmit visible light, with infrared light completely filtered; and a camera module for infrared imaging is provided corresponding to the infrared light filling-in function. For a full-screen terminal device (such as a notch display terminal or a water-drop display terminal), two camera modules provided in the front of the terminal device affect the appearance of the terminal device and also increase costs. In view of this, improvements are made in some embodiments of the present disclosure, and a camera module 108 that can be used for both general photography and infrared imaging during infrared light filling-in is used, as shown in FIG. 4.

A light filter between a lens of the camera module 108 and a photosensitive sensor is a tailored light filter. The light filter can transmit a specific amount of infrared light, and its infrared light transmittance is a third preset value greater than 0.

The third preset value is a smaller value, such as 1%. The infrared transmittance of the light filter can be adjusted depending on specific conditions. For example, when energy of the infrared fill-in light 106 as an emitter is insufficient, the transmittance of the light filter may be appropriately increased; and when the energy of the infrared fill-in light 106 as the emitter is sufficient, the transmittance of the light filter may be appropriately reduced. However, an adjustment range of the infrared transmittance of the light filter is limited. A too low infrared transmittance affects infrared imaging, and a too high infrared transmittance affects a general photography effect. Optionally, the adjustment range is from 0.3% to 1.5%.

Figure 5:
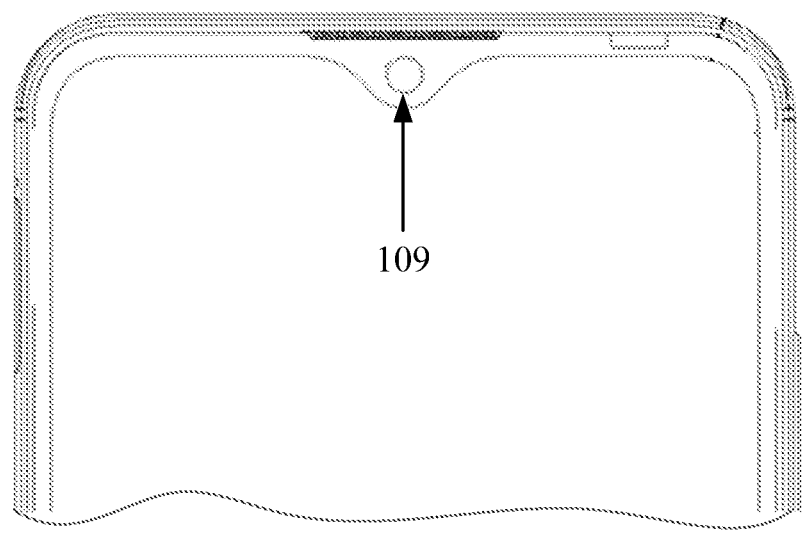
FIG. 5 is a first front view of a terminal device according to some embodiments of the present disclosure.

In some embodiments of the present disclosure, one camera module 108 can not only meet requirements of general photography, but also meet requirements of infrared imaging. Only one camera hole 109 needs to be punched on the glass cover plate, as shown in FIG. 5, thereby ensuring the appearance of the terminal device, and reducing production costs.

Figure 6:
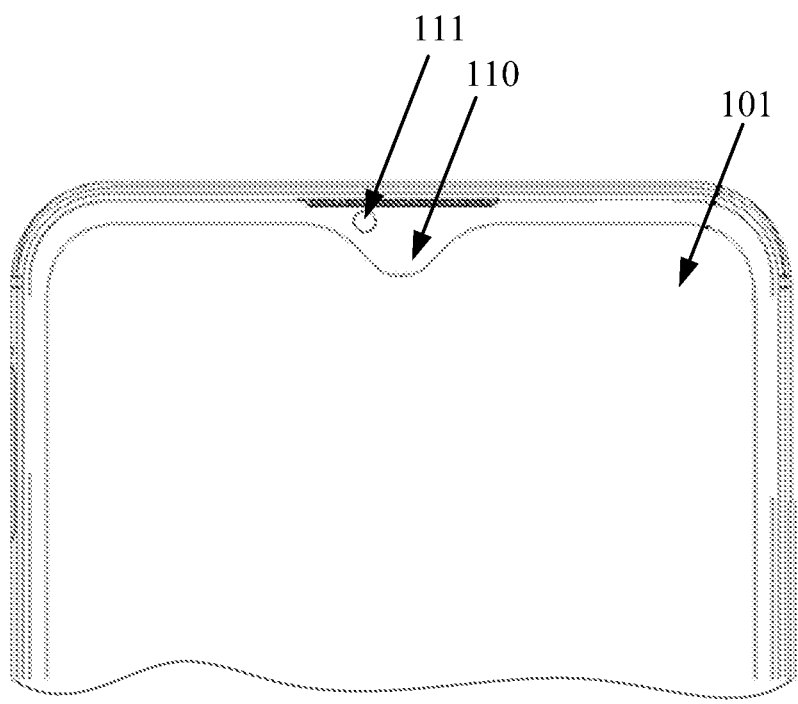
FIG. 6 is a second front view of a terminal device according to some embodiments of the present disclosure.
Figure 7:
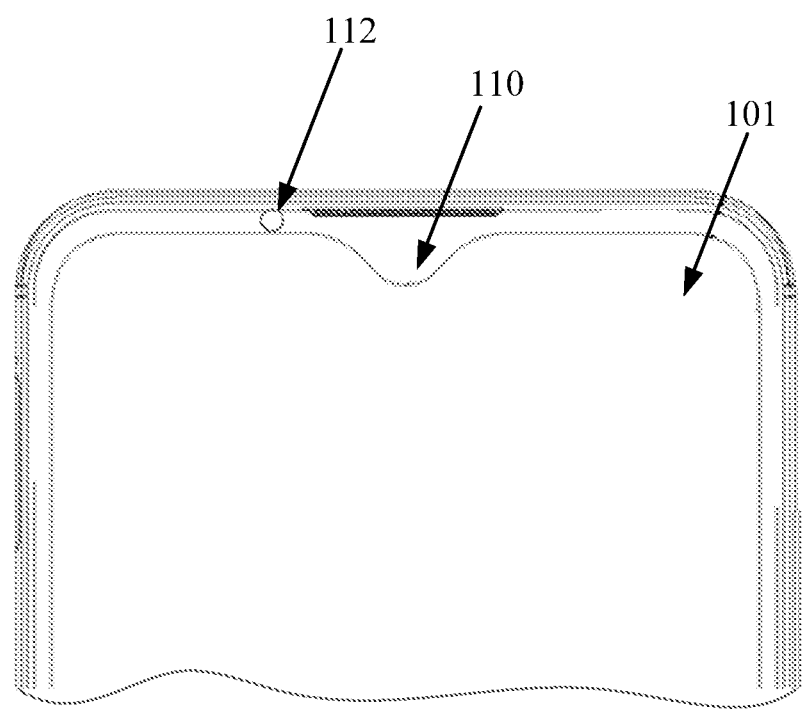
FIG. 7 is a third front view of a terminal device according to some embodiments of the present disclosure.

Optionally, as shown in FIG. 6 and FIG. 7, the terminal device described in some embodiments of the present disclosure may be a water-drop display terminal, and the display screen 101 has a notch 110 in the shape of a water drop, forming a water-drop display.

The notch 110 is usually disposed at one end of the display screen 101 corresponding to the top of the terminal device. An opening of the notch 110 faces the direction of the top of the terminal device. A width of the notch 110 along a width direction of the terminal device gradually decreases in the direction from the top to the bottom of the terminal device (that is, a length direction of the terminal device). Optionally, the notch 110 is an axially symmetrical figure.

For a water-drop display terminal device, because a screen-to-body ratio is large, a width of the accommodating gap 104 in the housing 103 is very small. The light guide column 105 is disposed in a narrower accommodating gap 104, and the width of the light guide column 105 needs to be reduced accordingly, but this may reduce light rays entering the light guide column 105 and affect the light guide effect. According to the infrared light filling-in structure described above in some embodiments of the present disclosure, the structure of the accommodating gap and the structure of the light guide column (such as the out-light surface and the in-light surface) are improved, and when applied to the water-drop display terminal, they can also meet the needs of users.

For the water-drop display terminal, the ink layer on the bottom surface of the glass cover plate includes: a first ink area that covers the notch 110 on the display screen 101 and matches the shape of the notch 110, and bar-shaped second ink areas respectively disposed on two sides of the first ink area. A width of the second ink area (the width in the direction from the top to the bottom of the terminal device) is less than a width of the first ink area (the width in the direction from the top to the bottom of the terminal device). The light guide column 105 may be disposed in the accommodating gap 104 below the first ink area, a position as indicated by 111 in FIG. 6, or may be disposed in the accommodating gap 104 below the second ink area, a position as indicated by 112 in FIG. 7.

Further, the camera module described above in some embodiments of the present disclosure can also be applied to a water-drop display terminal, thereby ensuring the appearance of the terminal device and reducing production costs.

In conclusion, in some embodiments of the present disclosure, a light-shielding body is disposed between the light guide column and the display screen. The light-shielding body can prevent light rays emitted by the infrared fill-in light from striking the display screen, and thereby avoid color changes and light leakage of the display screen. In addition, in order to improve the out-light effect, some embodiments of the present disclosure further provide improvements to the out-light surface and the in-light surface of the light guide column. Further, to ensure the appearance of the terminal device and reduce production costs, some embodiments of the present disclosure further provide improvements to the camera module, so that the use of one camera module can meet requirements of both general photography and infrared imaging.

In the description of the present disclosure, it should be understood that orientation or position relationships indicated by terms such as "central", "longitudinal", "transverse", "length", "width", "thickness", "upper", "lower", "front", "rear", "left", "right", "vertical", "horizontal", "top", "bottom", "inside", "outside", etc. are orientation or position relationships based on the accompanying drawings and are to facilitate the description of the present disclosure and simplify the description only, rather than indicating or implying that the apparatus or element referred to must have a particular orientation or be constructed and operated in a particular orientation, and will not to be interpreted as limiting the present disclosure.

In addition, the terms "first" and "second" are only used for descriptive purposes, and cannot be understood as indicating or implying relative importance or implicitly indicating a quantity of indicated technical features. Therefore, features defined with "first" and "second" may explicitly or implicitly include one or more of the features. In the description of the present disclosure, "a plurality of" means at least two, for example two, three, etc., unless otherwise specifically defined.

In the present disclosure, unless expressly stipulated and defined otherwise, the terms "mount", "join", "connect", "fasten" should be understood in a broad sense. For example, "connection" may be a fixed connection, a detachable connection, or an integral connection; may be a mechanical connection, or may be an electrical connection or intercommunication; or may be a direct connection, an indirect connection by means of an intermediate medium, or a connection between two elements or an interaction between two elements. For those of ordinary skill in the art, specific meanings of the foregoing terms in the present disclosure may be understood according to specific circumstances.

In the present disclosure, unless expressly specified and defined otherwise, a first feature being "above" or "below" a second feature may include direct contact between the first and second features, or may include that the first and second features may not be in direct contact, but in contact by means of another feature. Moreover, the first feature being "on" or "above" or "over" the second feature includes the first feature being directly above and obliquely above the second feature, or simply means that the level of the first feature is higher than that of the second feature. The first feature being "beneath" or "below" or "under" the second feature includes the first feature being directly below and obliquely below the second feature, or simply means that the level of the first feature is lower than that of the second feature.

Each embodiment of this specification is described in a progressive manner, each embodiment focuses on the difference from other embodiments, and the same and similar parts between the embodiments may refer to each other.

Although some optional embodiments in the embodiments of the present disclosure have been described, persons skilled in the art can make changes and modifications to these embodiments once they learn the basic inventive concept. Therefore, the appended claims are intended to be interpreted as including the optional embodiments and all changes and modifications that fall within the scope of the embodiments of the present disclosure.

Finally, it should be noted that in this specification, relationship terms such as "first" and "second" are merely used to distinguish one entity or operation from another, and do not necessarily require or imply that any actual relationship or sequence exists between these entities or operations. Moreover, the terms "include", "comprise", or their any other variants are intended to cover a non-exclusive inclusion, so that a process, a method, an article, or a terminal device that includes a list of elements not only includes those elements but also includes other elements that are not listed, or further includes elements inherent to such a process, method, article, or terminal device. Without being subject to further limitations, an element defined by a phrase "including a" does not exclude presence of other identical elements in the process, method, article, or terminal device that includes the very element.

The foregoing descriptions are merely optional implementations of the present disclosure. It should be noted that those of ordinary skill in the art may further make some improvements and refinements without departing from the principles of the present disclosure, and these improvements and refinements also fall within the protection scope of the present disclosure.

What is claimed is:

1. A terminal device, comprising:
a display screen;
a glass cover plate disposed above the display screen;
a housing with an accommodating gap, wherein the accommodating gap is below the glass cover plate;
a light guide column disposed in the accommodating gap; and
an infrared fill-in light is disposed below the light guide column, wherein
a light-shielding body is disposed between the light guide column and the display screen.

2. The terminal device according to claim 1, wherein the light-shielding body is disposed on a side wall of the accommodating gap that is close to a side of the display screen.

3. The terminal device according to claim 1, wherein an out-light surface of the light guide column that faces the glass cover plate comprises: a first out-light surface that faces the glass cover plate and is arc-shaped.

4. The terminal device according to claim 3, wherein projection of a light-emitting surface of the infrared fill-in light on the glass cover plate coincides with projection of the first out-light surface of the light guide column on the glass cover plate.

5. The terminal device according to claim 1, wherein an out-light surface of the light guide column that faces the glass cover plate comprises: a first out-light surface that faces the glass cover plate and is flat or arc-shaped, and a second out-light surface that faces a top direction of the terminal device and is inclined.

6. The terminal device according to claim 1, wherein an out-light surface of the light guide column that faces the glass cover plate comprises: a first out-light surface that faces the glass cover plate and is flat or arc-shaped, and a third out-light surface that is away from a top direction of the terminal device and is inclined.

7. The terminal device according to claim 1, wherein an out-light surface of the light guide column that faces the glass cover plate comprises: a first out-light surface that faces the glass cover plate and is flat or arc-shaped, a second out-light surface that faces a top direction of the terminal device and is inclined, and a third out-light surface that is away from the top direction of the terminal device and is inclined.

8. The terminal device according to claim 1, wherein an in-light surface of the light guide column is provided with a light guide patterned path for adjusting a propagation direction of light rays, wherein
    the light guide patterned path comprises: a circular central circle and a plurality of tooth-shaped structures arranged around the central circle, a surface of the central circle is arc-shaped, and teeth of the tooth-shaped structures point to a direction of the infrared fill-in light.

9. The terminal device according to claim 1, wherein a bottom surface of the glass cover plate is provided with an ink layer at a position corresponding to the accommodating gap, wherein
    an infrared light transmittance of the ink layer is greater than a first preset value, a visible light transmittance is less than a second preset value, and the first preset value is greater than the second preset value.

10. The terminal device according to claim 1, further comprising: a camera module for performing infrared imaging during photographing and infrared light filling-in, wherein an infrared light transmittance of a light filter between a lens of the camera module and a photosensitive sensor is a third preset value greater than 0.

* * * * *